US006700604B1

(12) United States Patent
Murata et al.

(10) Patent No.: US 6,700,604 B1
(45) Date of Patent: Mar. 2, 2004

(54) IMAGE CAPTURING METHOD AND APPARATUS FOR DETERMINING A SHAPE OF AN OBJECT

(75) Inventors: Norihiko Murata, Yokohama (JP); Takashi Kitaguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/252,879

(22) Filed: Feb. 18, 1999

(30) Foreign Application Priority Data

Feb. 18, 1998 (JP) ............................................ 10-051291
Jun. 8, 1998 (JP) ............................................ 10-158925

(51) Int. Cl.$^7$ ............................................... H04N 5/225
(52) U.S. Cl. .................... 348/207.99; 348/135
(58) Field of Search ....................... 348/207.99, 208.99, 348/208.1, 208.4, 135, 136, 137, 140, 141, 142, 222.1; 382/286–291; 359/618

(56) References Cited

U.S. PATENT DOCUMENTS 5,481,298 A * 1/1996 Sasaki et al. ................ 348/135
6,038,074 A * 3/2000 Kitaguchi et al. .......... 359/618

OTHER PUBLICATIONS

Kondo Toshiaki et al, Patent Abstracts of Japan Document No: 7–181024, Date: Jul. 18, 1995; Title: Method and Apparatus for Measuring Three–Dimensional Profile.
Ishikawa Motohiro et al, Patent Abstracts of Japan Document No: 9–081790, Date: Mar. 28, 1997; Title: Device and Method for Three–Dimensional Shape Restoration.
Yano Kotaro et al, Patent Abstracts of Japan Document No: 9–187038, Date: Jul. 15, 1997; Title: Three–Dimensional Shape Extract Device.
"Matrix and Rotation of a Rigid Body", Suurikagaku Pages 13–19, No. 407, May 1997.
"Motion Equation for a Plane", Kokurikigukunyumon, pp. 1–23, Koichiro Kato, Akio Oya, Keni Karagawa.

* cited by examiner

Primary Examiner—Tuan Ho
(74) Attorney, Agent, or Firm—Oblon, Spivak, McClelland, Maier & Neustadt, P.C.

(57) ABSTRACT

An image capturing apparatus for capturing an image of an object. The image capturing apparatus includes a correspondence detector which detects a correspondence of characteristic points of an object based upon captured images of the object. A motion detector detects a motion of the image capturing device. The motion detector includes magnetic sensors. Further, a shape calculator calculates a shape of the object based upon the captured image data, captured attitude information, a translation component, and the correspondence of the characteristic points. The motion detector may further include acceleration sensors and angle speed sensors. A disturbance detector may further be provided to detect a disturbance in acceleration signals output by the acceleration sensors and a disturbance in magnetic signals output by the magnetic sensors. In this situation, if a disturbance arises in the acceleration signals output by the acceleration sensors, an attitude of the image capturing apparatus can be based on signals output by the magnetic sensors and signals output by the angle speed sensors. Similarly, if a disturbance arises in the magnetic signals output by the magnetic sensors, an attitude of the image capturing apparatus can be determined utilizing the acceleration signals output by the acceleration sensors and the angle speed signals output by the angle speed sensors.

18 Claims, 15 Drawing Sheets

IMAGE CAPTURING METHOD AND APPARATUS FOR DETERMINING A SHAPE OF AN OBJECT

BACKGROUND OF THE INVENTION

1. Field of the Invention

This invention is generally related to an apparatus and method of capturing images of an object, e.g. image mosaicing, and more particularly is related to an apparatus and method of capturing images by a combination of acceleration sensors and magnetic sensors, and optionally angular speed sensors.

2. Background of the Invention

It is known to capture a three-dimensional image of an object, for example if an image mosaicing operation is desired, or to represent a three-dimensional image on a computer. Systems for generating three-dimensional images of an object are known. These systems can be viewed as either active processes or passive processes.

One known active process is a wave propagation method in which a camera calculates a distance to an object based on a measured propagation time of a reflection wave from the object, for example by a reflective light wave, radio wave, or sound wave. Another active process is a light propagation method in which a light source located at a predetermined position irradiates a slit light or a spot light onto an object. A detector then detects the shape of the object by measuring a distortion of the slit light or the spot light.

Each of these active processes, however, suffers from a drawback in that it is difficult to miniaturize the apparatuses to implement such processes and have the apparatuses still make the required measurements.

The passive types of processes include a binocular stereo process and a motion stereo process. In a binocular stereo process plural cameras are located at predetermined positions and attitudes relative to an object, and these plural cameras each capture an image of the object. Then, a correspondence of characteristic points or ranges between each image of the object is carried out. The three-dimensional shape of the object can then be calculated by utilizing the principle of a triangular surveying based on the plural images detected by the plural cameras. In the motion stereo process a single camera captures images of the object, but the single camera is moved to capture successive images of the object from different points. Then, a correspondence of characteristic points or ranges between all of the captured successive images of the object are carried out as the camera moves. The three-dimensional shape of the object can then be calculated based upon the correspondence of the characteristic points or ranges.

However, these passive processes of the binocular stereo process and motion stereo process also suffer from drawbacks. More particularly, in each of these systems an error caused by noise of the correspondence of the characteristic points or ranges between each image arises. Further, if there is a low disparity between sequential images, a large measurement error may arise. Further, in the motion stereo process a repetitive calculation of a complex non-linear equation must be executed because there are no predetermined relationships between the position of the object and the camera.

Certain Japanese Laid-Open Patents have addressed problems in capturing three-dimensional images of an object.

Japanese Laid-Open Patent No. 07-181024 discloses an image pick-up apparatus, e.g. a camera, which includes a stroke detector which utilizes an acceleration sensor and an angle speed sensor. The stroke detector detects the stroke of the camera. The system then evaluates the stroke with respect to a translational component and a rotational component of the stroke. Then, a reconstruction of the three-dimensional shape is executed by a result of searching for correspondence points.

However, this system disclosed in Japanese Laid-Open Patent No. 07-181024 has a drawback in that the calculation of the stroke requires an integration. Therefore, an error component of the stroke is accumulated.

Japanese Laid-Open Patent No. 09-81790 sets forth a system in which a movement of a camera is detected by an angular speed sensor and an acceleration sensor. A high speed restoration of the three-dimensional object is carried out while preventing a disappearance of a characteristic point by revision of a light axis direction such as a different light axis from a viewpoint to not intersect.

However, the device disclosed in Japanese Laid-Open Patent No. 09-81790 suffers from a drawback in that the device has a complex structure because an optical axis is changed.

Japanese Laid-Open Patent No. 09-187038 sets forth a system in which images of a three-dimensional object are captured from plural viewpoints so that parts of the images are duplicated with each other. An image pick-up parameter is then calculated by a signal corresponding to a position of a lens and a signal corresponding to a position of the camera. A distance distribution to the object is then calculated whenever a shutter is pushed. The three-dimensional model of the object is then generated based upon the distance distribution.

However, this system disclosed in Japanese Laid-Open Patent No. 09-187038 also suffers from a drawback in that the calculation of the stroke requires an integration. Therefore, again the error component of the stroke is accumulated.

SUMMARY OF THE INVENTION

Accordingly, it is one object of the present invention to provide a novel apparatus for generating a three-dimensional image which can overcome the drawbacks in the background art.

Another object of the present invention is to provide a novel three-dimensional image forming apparatus which can generate a three-dimensional image of an object with a simple and accurate structure.

Another object of the present invention is to provide a novel three-dimensional image forming apparatus which can generate a three-dimensional image of an object while also compensating for any disturbances in a detector.

The present invention achieves these and other objects by providing a novel image capturing apparatus for capturing an image of an object. The novel image capturing apparatus includes a correspondence detector which detects a correspondence of characteristic points of an object based upon captured images of the object. A motion detector detects a motion of the image capturing device. The motion detector includes magnetic sensors. Further, a shape calculator calculates a shape of the object based upon the captured image data, captured attitude information, a translation component, and the correspondence of the characteristic points.

Further, in the novel image capturing apparatus of the present invention the motion detector may further include acceleration sensors and angle speed sensors. A disturbance detector may further be provided to detect a disturbance in acceleration signals output by the acceleration sensors and a disturbance in magnetic signals output by the magnetic sensors. In this situation, if a disturbance arises in the acceleration signals, an attitude of the image capturing device can be based on signals output by the magnetic sensors and signals output by the angle speed sensors. Similarly, if a disturbance arises in the magnetic signals output by the magnetic sensors, an attitude of the image capturing device can be determined utilizing the acceleration signals output by the acceleration sensors and the angle speed signals output by the angle speed sensors.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
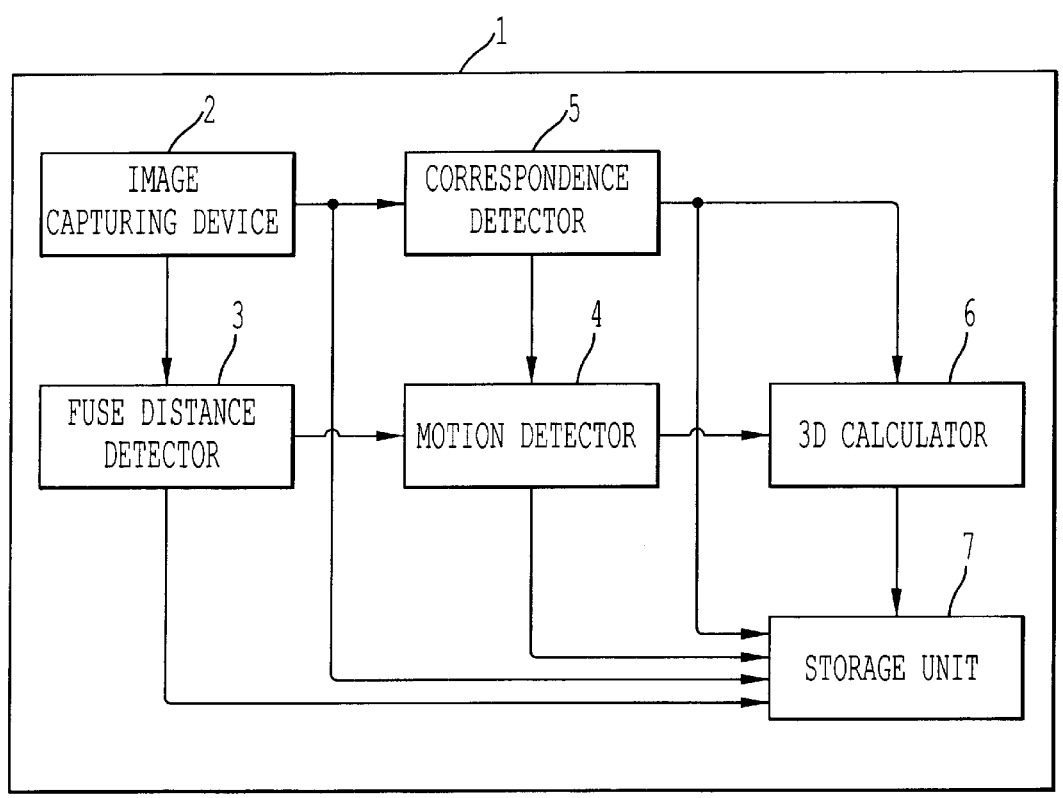
FIG. 1 shows an overall view of an image capturing apparatus and system of the present invention.

Referring now to the drawings, wherein like reference numerals designate identical or corresponding parts throughout the several views, and more particularly to FIG. 1, an image capturing apparatus 1 of the present invention is shown in block diagram form. Referring to FIG. 1, the image capturing apparatus 1 includes an image capturing device 2, a focus distance detector 3, a motion detector 4, a correspondence detector 5, a 3-D calculator 6, and a storage unit 7.

The image capturing device 2 includes an image sensor, such as a combination of a lens and a CCD, and a sample and hold circuit. The image capture device 2 takes images of an object and converts the information corresponding to the taken images to electrical signals. The focus distance detector 3 calculates a focus distance based upon a position of, e.g., a lens in the image capturing device 2 and outputs coded signals corresponding to the calculated focus distance. The motion detector 4 calculates a translation component, i.e. attitude information and position information, of the image capturing device 2 while the image capturing device 2 moves and takes the images. The correspondence detector 5 carries out correspondence of characteristic points between each image which the image capture device 2 takes while moving. In carrying out the correspondence of the characteristic points, the following techniques (1), (2), (3) can be employed: (1) a characteristic tracking method is generally employed in a moving picture technique; (2) a correlation method, for example block matching, is employed in moving image compression; (3) a method that calculates a speed field of the image by spaciotemporal and further calculates a moving vector of images.

The 3-D calculator 6 calculates the 3-D shape of the object by, e.g., a triangular survey based upon the results of the correspondence of the characteristic points in the correspondence detector 5, the attitude information, and the translation component.

The storage unit 7 is a memory, such as a RAM, ROM, magnetic tape, and so fourth. The storage unit 7 stores each image, the 3-D shape of the object, the attitude information, and the translation component.

Figure 2:
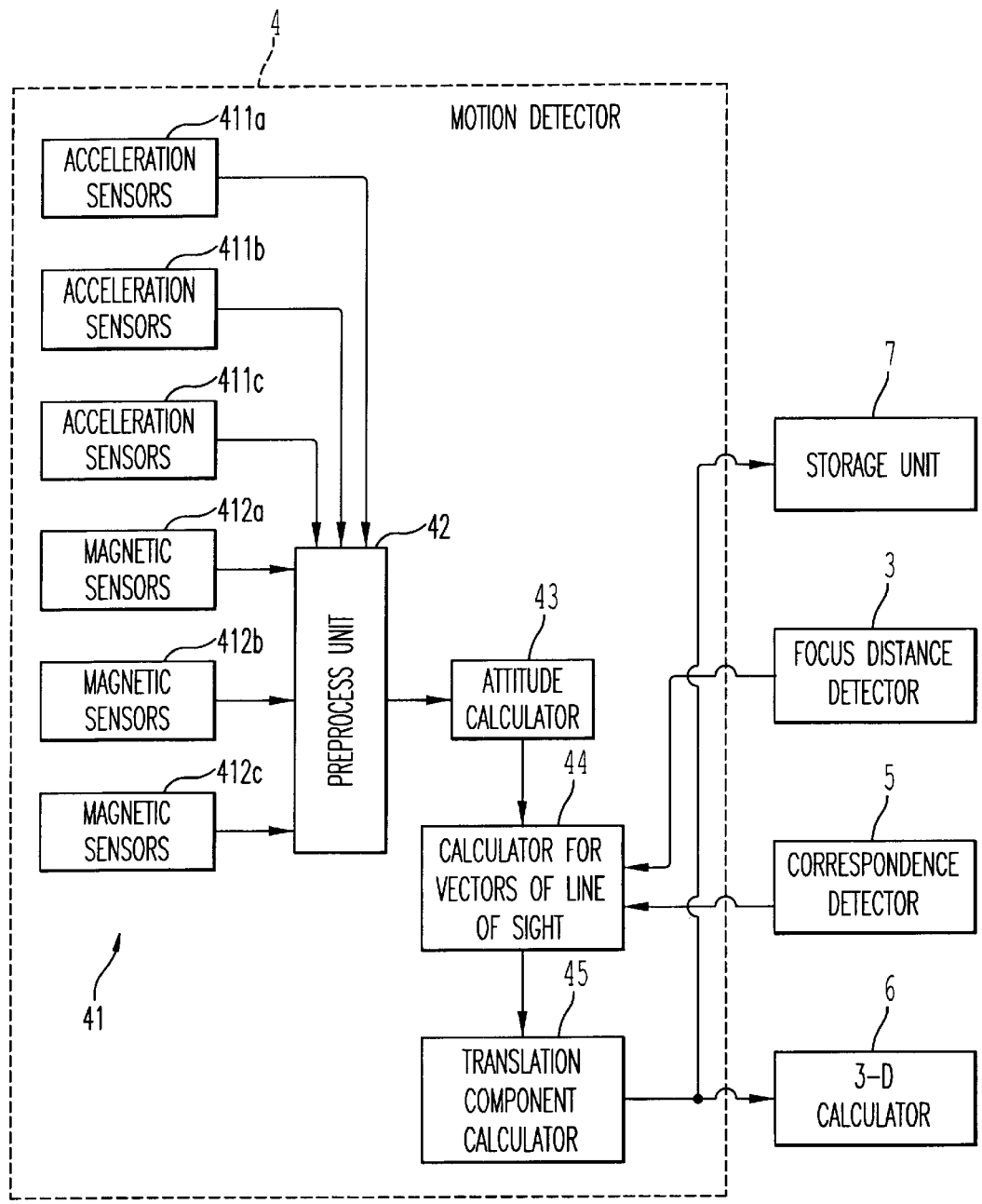
FIG. 2 shows specifics of a first embodiment of a motion detector of the image capturing apparatus of FIG. 1.

Referring to FIG. 2, a first embodiment of the motion detector 4 is shown in detail in which the motion detector 4 includes a sensor portion 41, a preprocess unit 42, an attitude calculator 43, a calculator for vectors of line of sight 44, and a translation component calculator 45.

The sensor portion 41 is made up of three-axis acceleration sensors 411$a$, 411$b$, 411$c$ and three-axis magnetic sensors 412$a$, 412$b$, 412$c$. The three-axis acceleration sensors 411$a$ to 411$c$ detect attitude relative to a gravity direction of the image capturing device 2.

Figure 3:
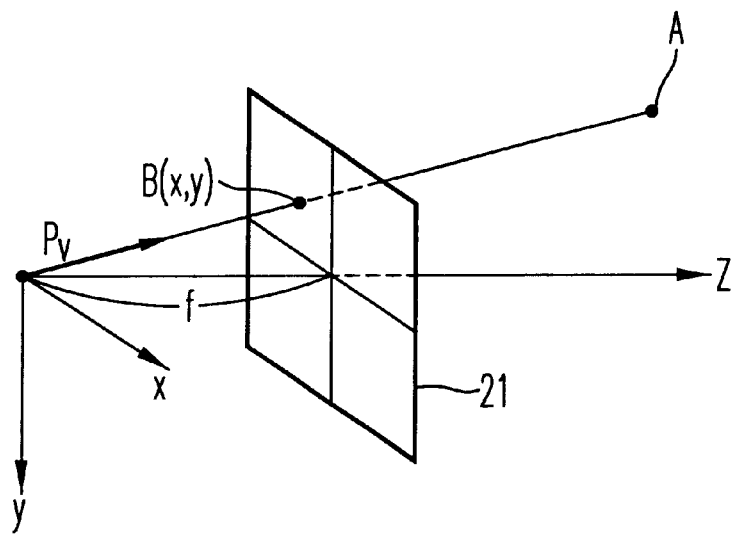
FIG. 3 shows camera coordinates utilized in the image capturing apparatus of FIG. 1.
Figure 4:
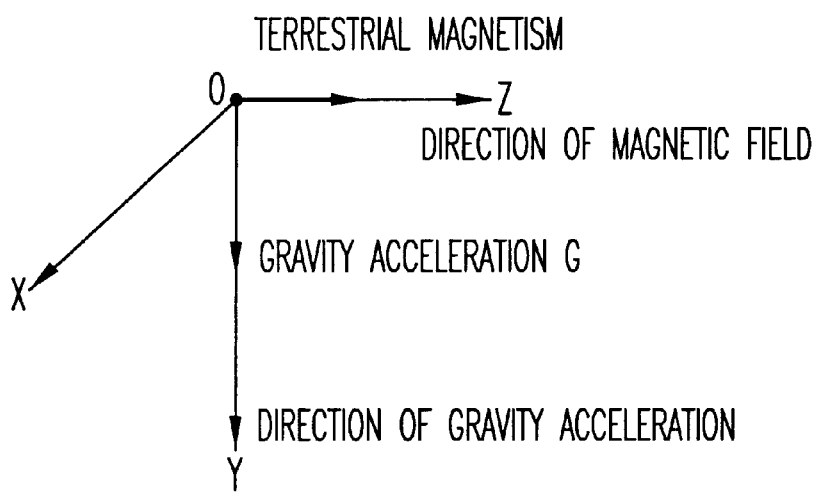
FIG. 4 shows a world coordinate system utilized in the present invention.
Figure 7:
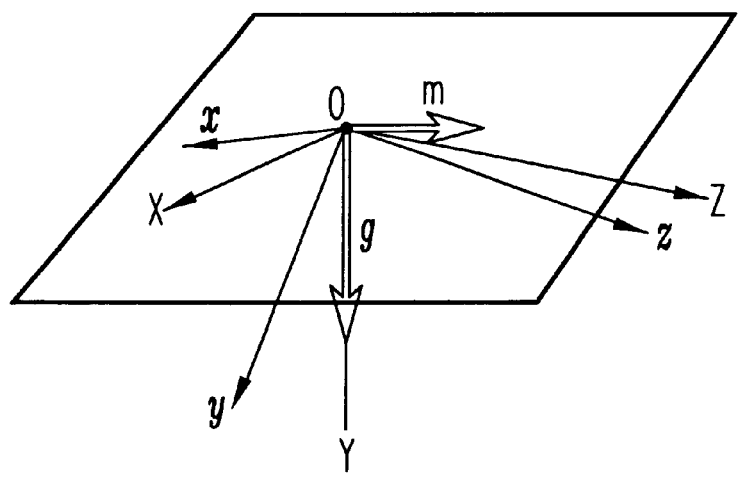
FIG. 7 shows a relation between camera coordinates and world coordinates.

The operation of the motion sensor 4 shown in FIG. 2 will now be further explained with reference to FIGS. 3 and 4. FIG. 3 shows a coordinate system for the orientation of the image capturing device 2, i.e., a camera coordinate system, and FIG. 4 shows a world coordinate system setting forth axes for the north-south direction, east-west direction, and a direction of gravity, i.e. a direction towards the earth. FIG. 7 further shows the relation between a camera coordinate system and a world coordinate system in a superimposing manner.

Referring now to FIG. 3, the z direction of a camera coordinate of the image capturing device 2 is a light direction. The x direction of the coordinate of the image capturing device 2 is a right direction for an image surface 21. The y direction is a downward direction of the image surface 21. Referring now to FIG. 4, the Y direction of the world coordinates is a gravity direction. The Z direction of the world coordinates is a direction of terrestrial magnetism, i.e. a north-south direction. The Y direction of the world coordinates is a direction corresponding to the right-hand coordinate rule with reference to the X-axis, the X-axis being in an east-west direction.

In this embodiment, it is assumed that the acceleration component of the image capturing device 2 can be ignored and that the terrestrial magnetism, in the Z direction, only exists as a magnetic field and is orthogonal to an axis of the direction of the gravity acceleration, i.e. the Y direction. As a matter of fact, a magnetic dip exists. Therefore, the gravity acceleration is not orthogonal to the axis of direction of the terrestrial magnetism. However, the calculation process is the same as above if the magnetic dip is known. Furthermore, the attitude information of the image capturing device 2 can calculate when the terrestrial magnetism is detected with the three-axis magnetic sensors 412a–412c, even if magnetic dip is unknown.

In FIG. 2, the acceleration sensor 411a detects the x component of the gravity acceleration. The acceleration sensor 411b detects the y component of the gravity acceleration. The acceleration sensor 411c detects the z component of the gravity acceleration. In this way, the acceleration sensors 411a–411c sense a tilt of the camera. The magnetic sensors 412a, 412b, 412c detect x, y, z components of the terrestrial magnetism, respectively. That is, the magnetic sensors 412a–412c sense a camera position relative to north-south, such as in a navigation system.

The preprocess unit 42 carries out a filtering of the output signals from the three-axis acceleration sensors 411a–411c and the three-axis magnetic sensors 412a–412c. The preprocess unit 42 also carries out A/D conversion and signal processing such as to amplitude. The attitude calculator 43 calculates the attitude information of the image capturing device 2 based upon the signal from the preprocess unit 42. The calculator for vectors of line of sight 44 calculates the vector of line of sight with reference to the world coordinates for each correspondence point at a time when the correspondence detector 5 outputs a signal based upon the calculated attitude information from the attitude calculator 43 and the focus information from the focus distance detector 3. The translation component calculator 45 calculates the translation component of the image capturing device 2 by lining-up of the vectors of line of sight with reference to correspondence points on the world coordinates at each time of a calculation by the calculator for vector of line of sight 44.

A calculation for the translation of the image capturing device 2 is executed based on the following rotation matrix (1):

$$R = \begin{pmatrix} \cos\beta & 0 & \sin\beta \\ 0 & 1 & 0 \\ -\sin\beta & 0 & \cos\beta \end{pmatrix} \begin{pmatrix} 1 & 0 & 0 \\ 0 & \cos\alpha & -\sin\alpha \\ 0 & \sin\alpha & \cos\alpha \end{pmatrix} \begin{pmatrix} \cos\gamma & -\sin\gamma & 0 \\ \sin\gamma & \cos\gamma & 0 \\ 0 & 0 & 1 \end{pmatrix} \quad (1)$$

in which $\alpha$, $\beta$, $\gamma$ are rotation angles with reference to X, Y, Z of the world coordinates. In this way, this equation (1) performs a conversion from the camera coordinates of FIG. 3 to the world coordinates of FIG. 4.

The above equation (1) is determined in the following steps. First, the initial position is that X, Y, Z of the world coordinates is equal to x,y,z of the camera coordinates on the basis of the image capturing device 2. The image capturing device 2 is rotated only $\gamma$ to the Z axis circumference from the initial condition. In a next step the image capturing device 2 rotates only $\alpha$ to the X axis circumference, and finally rotates only $\beta$ to the Y axis circumference.

The calculation of these values for $\alpha$, $\gamma$, and $\beta$ is now described.

A vector of the gravity acceleration gv and a vector of the terrestrial magnetism Mv on the world coordinates are described in the following equation (2):

$$g_v = \begin{vmatrix} 0 \\ g \\ 0 \end{vmatrix} \quad M_v = \begin{vmatrix} 0 \\ M\sin\phi \\ M\cos\phi \end{vmatrix} \quad (2)$$

in which M is an absolute value of the terrestrial magnetism, and $\phi$ is magnetic dip of the terrestrial magnetism.

A vector of acceleration av with reference to the x,y,z of the camera coordinates on the basis of the image capturing device 2 is described in the following equation (3):

$$a_v = \begin{vmatrix} a_x \\ a_y \\ a_z \end{vmatrix} \quad m_v = \begin{vmatrix} m_x \\ m_y \\ m_x \end{vmatrix} \quad (3)$$

A terrestrial magnetism mv with reference to the x,y,z of the camera coordinates on the basis of the image capturing device 2 is also described in the following equation (4).

$$Ra_v = g_v \quad (4)$$

Equation (4) sets forth the relation between the vector of the gravity acceleration gv and the vector of acceleration av and the rotation matrix R. The vector of the terrestrial magnetism Mv, the vector of the terrestrial magnetism mv, and the rotation matrix R are related as shown in equation (5) as follows:

$$Rm_v = M_v \quad (5)$$

in which rotation angles $\alpha$, $\gamma$ are calculated by the following equations (6), (7):

$$\alpha = \sin^{-1}\left(\frac{-a_z}{g}\right) = \sin^{-1}\left(\frac{-a_z}{\sqrt{a_x^2 + a_y^2 + a_z^2}}\right) \quad (6)$$

$$\gamma = \sin^{-1}\left(\frac{a_x}{g\cos\alpha}\right) = \sin^{-1}\left(\frac{a_x}{\sqrt{a_x^2 + a_y^2 + a_z^2} \cdot \cos\alpha}\right) \quad (7)$$

After rotation angles $\alpha$, $\gamma$ are determined by the above equations, the vector of the terrestrial magnetism mv and the rotation angle $\beta$ are calculated by the following equations (8), (9).

$$\cos\beta = \frac{m_z + \sin\phi\sin\alpha}{M\cos\phi\cos\alpha} \quad (8)$$

$$\sin\beta = \frac{-m_x\cos\alpha + m_z\sin\alpha\sin\gamma + \sin\phi\sin\gamma}{M\cos\phi\cos\alpha\cos\gamma} \quad (9)$$

With the mechanism just described, the attitude calculator 43 calculates the rotation angles $\alpha$, $\beta$, $\gamma$ and the rotation matrix R based upon the detection signals from the three-axis acceleration sensors 411a to 411c and the three-axis magnetic sensors 412a to 412c.

Referring again to FIGS. 3 and 4, on the assumption that the optical system of the image capturing device 2 is a pinhole camera vision model of which the focus distance is f, the following equation (10) is capable of calculating a unit vector, with a length of 1, of the line of sight p that corresponds to a pont B(x,y) on the image surface 21 that is equal to the point A of the object (see FIG. 3).

$$p = \frac{1}{\sqrt{x^2 + y^2 + f^2}} \begin{pmatrix} x \\ y \\ f \end{pmatrix} \quad (10)$$

The unit vector of the line of sight p is a vector with reference to x,y,z of the camera coordinates on the basis of the image capturing device 2.

Figure 5:
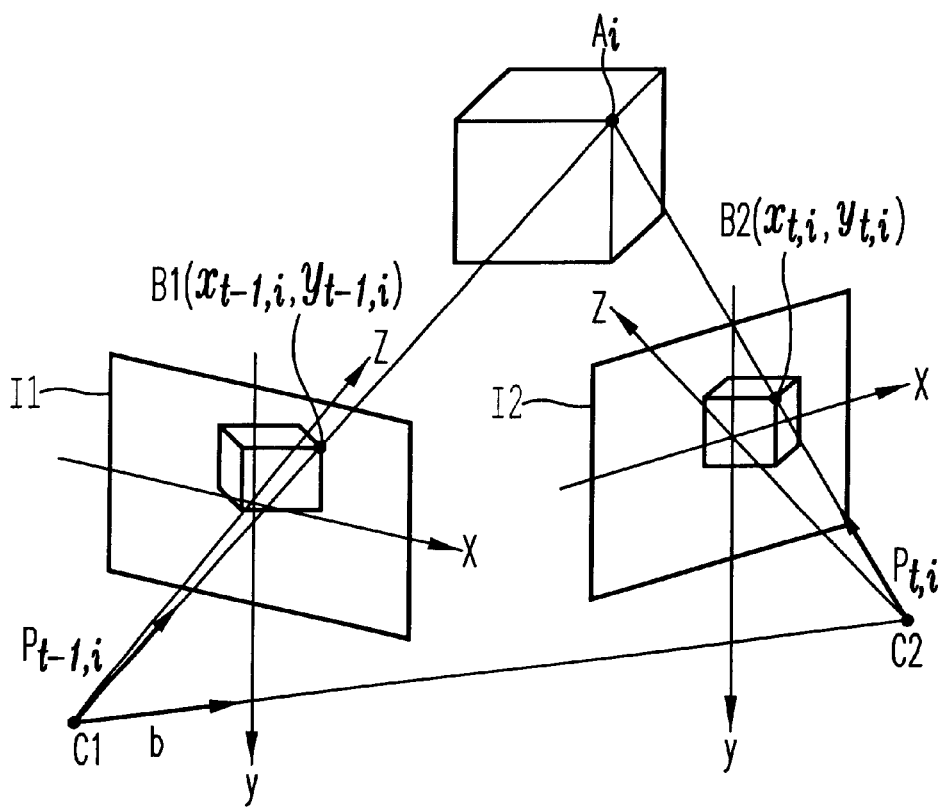
FIG. 5 shows a diagram for explaining an operation of capturing an image in the present invention.

Referring now to FIG. 5, a point C1 is a viewpoint when the image capturing apparatus 1 captures an image of the 3-D object at the time t–1. A point C2 is a viewpoint when the image capturing apparatus 1 captures an image of the same 3-D object from another angle at the time t.

At the viewpoint C1, the characteristic point of the image on the image surface I1 is $B1(X_{t-1,i}, Y_{t-1,i})$. The unit vector of the line of sight $p_{(t-1,i)}$ is described by the following equation (11). On the other hand, at the viewpoint C2 the characteristic point of the image on the image surface I2 is $B2(x_{t,i}, y_{t,i})$. At the viewpoint C2 the unit vector of the line of sight $p_{(t,i)}$ is described by the following equation (12).

$$p_{t-1,i} = \frac{1}{\sqrt{x_{t-1,i}^2 + y_{t-1,i}^2 + f^2}} \begin{pmatrix} x_{t-1,i} \\ y_{t-1,i} \\ f \end{pmatrix} \quad (11)$$

$$p_{t,i} = \frac{1}{\sqrt{x_{t,i}^2 + y_{t,i}^2 + f^2}} \begin{pmatrix} X_{t,i} \\ Y_{t,i} \\ f \end{pmatrix} \quad (12)$$

These unit vectors $p_{(t-1,i)}$ and $p_{(t,i)}$ thus provide two different unit vectors at two different points in time based on the camera coordinates x,y,z. These unit vectors based on the camera coordinates must then be converted to the world coordinates. In the case that the unit vectors $p_{(t-1,i)}$ and $p_{(t,i)}$ with reference to x,y,z of the camera coordinate on the basis of the image capturing device 2 are changed to the unit vectors $P_{(t-1,i)}$ and $P_{(t,i)}$ for the world coordinates, the rotation matrix $R_{t-1}$ at the time t–1 and the rotation matrix $R_t$ at the time t are considered.

Thus, the calculator for vectors of line of sight 44 changes the unit vectors $p_{(t-1,i)}$ and $p_{(t,i)}$ for the camera coordinates to the unit vectors $P_{(t-1,i)}$ and $P_{(t,i)}$ for the world coordinates by the following equations (13), (14).

$$P_{t-1,i} = R_{t-1} p_{t-1,i} \quad (13)$$

$$P_{t,i} = R_t p_{t,i} \quad (14)$$

The translation component calculator 45 calculates the translation component of the image capturing device 2 based upon the vectors of line of sight with reference to the correspondence points at each time on the world coordinates calculated by the calculator for vectors of line of sight 44.

For example, when the vector of line of sight $p_{(t-1,i)}$ sequentially corresponds to the vector of line of sight $P_{(t,i)}$, the vectors $p_{(t-1,i)}, p_{(t,i)}$ and the unit vector of the translation component b are located in one plane. The relation between the above vectors is described as the following scalar triple product (15).

$$(P_{t-1,i} \times b, P_{t,i}) = 0 \quad (15)$$

The vector of the translation component b satisfies the above equation (15). However, all correspondence points may not satisfy the above equation because of noise in the images. Therefore, when the N pairs of the correspondence points exist, it is enough that the vector b minimizes the next least squares equation (16).

$$\sum_{i=1}^{N} |P_{t-1,i} \times b, P_{t,i}| \to \min \quad (16)$$

Figure 6:
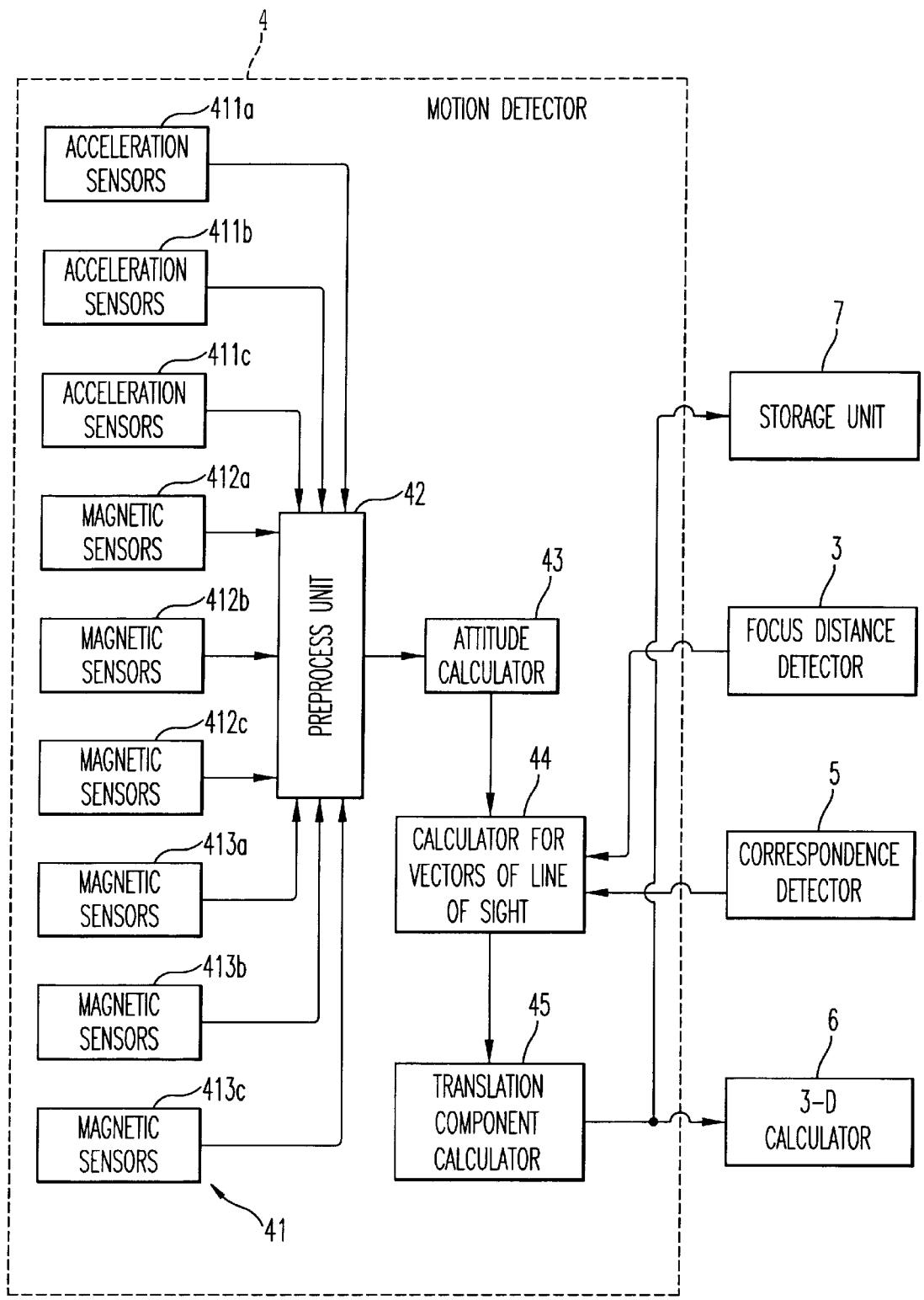
FIG. 6 shows a second embodiment of a motion detector of the present invention.

FIG. 6 shows a further embodiment of the motion detector 4 of the present invention. This further embodiment is similar to the embodiment of FIG. 2 except that the motion detector 4 further includes plural angle speed sensors 413a to 413c in the sensor portion 41.

In this second embodiment, the solution is carried out by the combination between the three-axis acceleration sensors 411a–41c and the three-axis angle speed sensors 413a–413c. An explanation of the coordinate exchange of the three-axis acceleration signals is omitted because the solution is the same as in the above-discussed first embodiment. Specifically, the rotation matrix R is calculated by equation (1), gv is calculated by equation (2), av is calculated by equation (3), α is calculated by equation (6), and γ is calculated by equation (7).

In this second embodiment of FIG. 6, the detected vector of angle speed qv with reference to x,y,z of the camera coordinates of the image capturing device 2 is described in equation (17), which is an output of the angle speed sensors 413a–413c.

$$q_v = \begin{bmatrix} q_x \\ q_y \\ q_z \end{bmatrix} \quad (17)$$

The change of the rotation angles α, β, γ with respect to time is described in the following equations (18), (19), and (20).

$$\frac{d\alpha}{dt} = q_x \cos\gamma - q_y \sin\gamma \quad (18)$$

$$\frac{d\beta}{dt} = q_x \frac{\sin\gamma}{\cos\alpha} + q_y \frac{\cos\gamma}{\cos\alpha} \quad (19)$$

$$\frac{d\gamma}{dt} = q_x \tan\alpha \sin\gamma + q_y \tan\alpha \cos\gamma + q_z \quad (20)$$

The derivation of equations (18), (19), and (20) can be learned in greater detail from the documents "Matrix and Rotation of a Rigid Body", Suurikagaku pages 13–19, No. 407, May 1997, and "Motion Equation for a Plane", Kokurikigukunyumon, pages 1–23, Koichiro Kato, Akio Oya, Kenji Karagawa, the entire contents of these documents being incorporated herein by reference.

Each angle α, β, γ is calculated by integrating the above equations. Therefore, each angle at the time t=0 is represented by the following equations (21)–(23).

$$\alpha = \alpha_0 + \int_0^t d\alpha \quad (21)$$

$$\beta = \beta_0 + \int_0^t d\beta \quad (22)$$

$$\gamma = \gamma_0 + \int_0^t d\gamma \quad (23)$$

With the solution just described, the rotation angles α, β, γ and the rotation matrix R are calculated.

The calculator for the vector of the line of sight 44 and the translation component calculator 45 calculate the translation component of the image capturing device 2 based upon translation components of the image capturing device 2 based upon the same equations (10) to (16) in the first embodiment.

In the above embodiments, at least a combination of the three-axis acceleration sensors 411a to 411c and the three-axis magnetic sensors 412a to 412c are employed. The present invention is also capable of employing a combination of the three-axis acceleration sensors 411a to 411c, the three-axis angle speed sensors 413a to 413c, and the three-axis magnetic sensors 412a to 412c, as in the second embodiment of FIG. 6.

The correspondence detector 5 carries out correspondence between sequential characteristic points of images corresponding to the object. For example, the correspondence points are detected based upon block matching by correlation on two adjacent sequential images as follows.

Referring again to FIG. 5, Pi ($x_{io}, y_{io}$) is a characteristic point of the ith image on the image surface I1 when the image capturing device 2 captures an image of the object at the time t−1 on the first viewpoint C1. Pi ($x_{io}$+dx,$y_{io}$+dy) is a characteristic point of the ith image on the image surface I2 when the image capturing device 2 captures an image of the object at the time t on the second viewpoint C2.

Figure 8A:
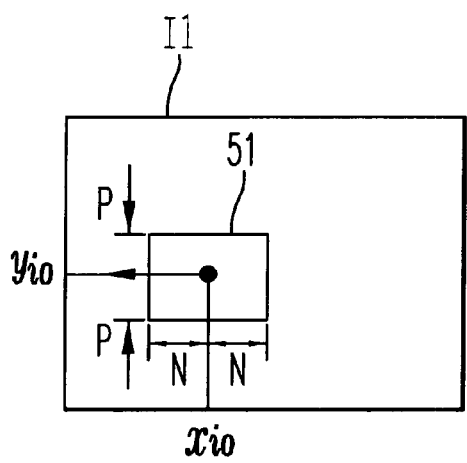
FIG. 8 shows an operation of evaluating correspondence points in the present invention.
Figure 8B:
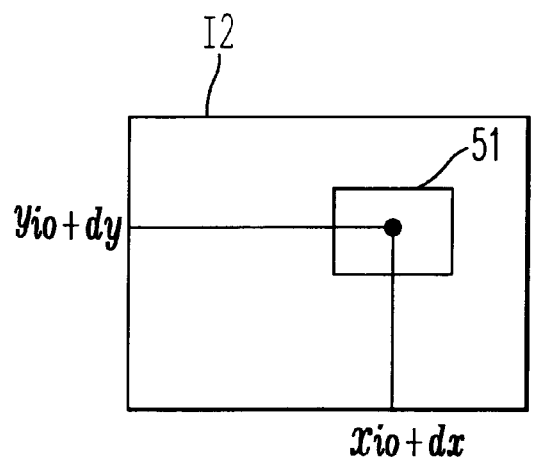

Referring to FIG. 8, when the correspondence of the characteristic point Pi($x_{io},y_{io}$) and Pi($x_{io}$+dx,$y_{io}$+dy) is carried out in correspondence detector 5 by the block matching that employs the correlation window 51 such as (2N+1), (2P+1), the correspondence point at which a value of mutual correlation Si is a maximum is sequentially selected as follows:

$$S_1 = \frac{1}{K} \sum_{x=-N}^{N} \sum_{y=-P}^{P} [I_{t-1}(x_{i0} + x, y_{i0} + y) - MI_{t-1}(x_{i0}, y_{i0})]$$

$\times [I_{t-1}(x_{i0}+dx+x, y_{i0}+dy+y)-MI_{t-1}(x_{i0}+dx, y_{i0}+y)]$ (24)

in which $I_{t-1}(x,y)$ is a concentration at the position (x,y) of the image surface I1 at the time t−1;

$I_t(x,y)$ is a concentration at the position (x,y) of the image surface I2 at the time t;

$MI_{t-1}$ (x,y) is an average concentration corresponding to the correlation window 51 such as (2N+1),(2P+1) centering the position (x,y) of the image surface II at the time t−1;

$MI_t(x,y)$ is an average concentration corresponding to the correlation window 51 such as (2N+1),(2P+1) centering the position (x,y) of the image surface I2 at the time t; and K is a constant.

In this way, the correspondence detector 5 finds characteristic points in different image plans using the equation (24). Such an operation is similar to that disclosed in U.S. patent application Ser. No. 09/081,020, the entire contents of which are incorporated herein by reference.

Figure 9:
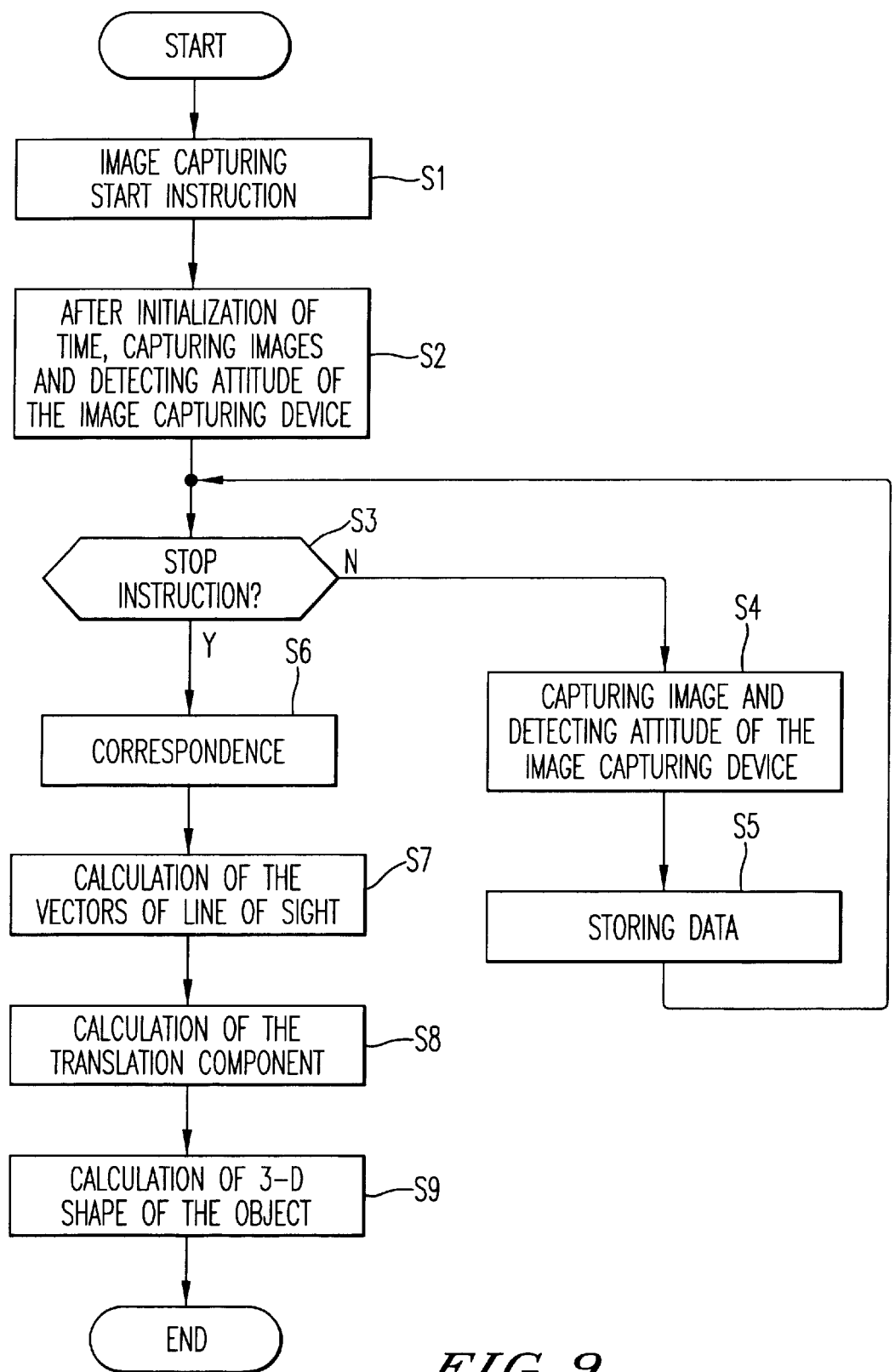
FIG. 9 shows a control operation which can be executed in the present invention.

Referring to FIG. 9, a process of the present invention which can be implemented utilizing the motion detectors of FIG. 2 or FIG. 6 is described. At step S1, an image capturing start instruction is generated. The process then proceeds to step S2. In step S2 the time is initialized to t=0. Also in step S2, the image signals, acceleration signals, magnetic signals, and optionally angle speed signals, are captured, and further the initial angles α0, β0, γ0 of the image capturing device 1 are detected. The initial angles α0, β0, γ0 are calculated based upon the detection of the gravity acceleration. The initial angle β0 is calculated further based upon the magnetic signal when the magnetic sensors 412a–412c are employed. On the other hand, the initial angle β0 is preset to zero when the angle speed sensors 413a–413c are employed. The process then proceeds to step S3. In step S3 the image capture and the attitude detection are carried out at predetermined time intervals until a stop instruction of the image capturing start instruction is generated. Each image and attitude information corresponding to each time is then captured and stored in (steps S4 and S5) until the stop instruction is generated in step S3.

When the stop instruction is generated, i.e. YES in step S3, the process proceeds to step S6. In step S6 the correspondence is carried out based upon the stored sequential image data. The process then proceeds to step S7, in which the vector of the line of sight with reference to the correspondence points on the world coordinates at the each time is calculated based upon the result of the correspondence and the attitude information.

The process then proceeds to step S8, in which the vector of the translation component is calculated based upon the vectors of the line of sight. Finally, in step S9 the 3-D shape of the object is calculated by, e.g., the triangular surveying based upon the translation component and the attitude information.

In the above embodiments, it is assumed that the acceleration of the image capturing device 1 is small and is capable of being disregarded in comparison with the gravity acceleration, it is assumed that the terrestrial magnetism only exists in the magnetic field, and the relation between the equations (2) and (3) is made up of the relation between the next equations (25) and (26).

$$\|g_v\| \approx \|a_v\| \leftrightarrows g \approx \sqrt{a_x^2+a_y^2+a_z^2} \quad (25)$$

$$\|M_v\| \approx \|m_v\| \leftrightarrows M \approx \sqrt{m_x^2+m_y^2+m_z^2} \quad (26)$$

Figure 10:
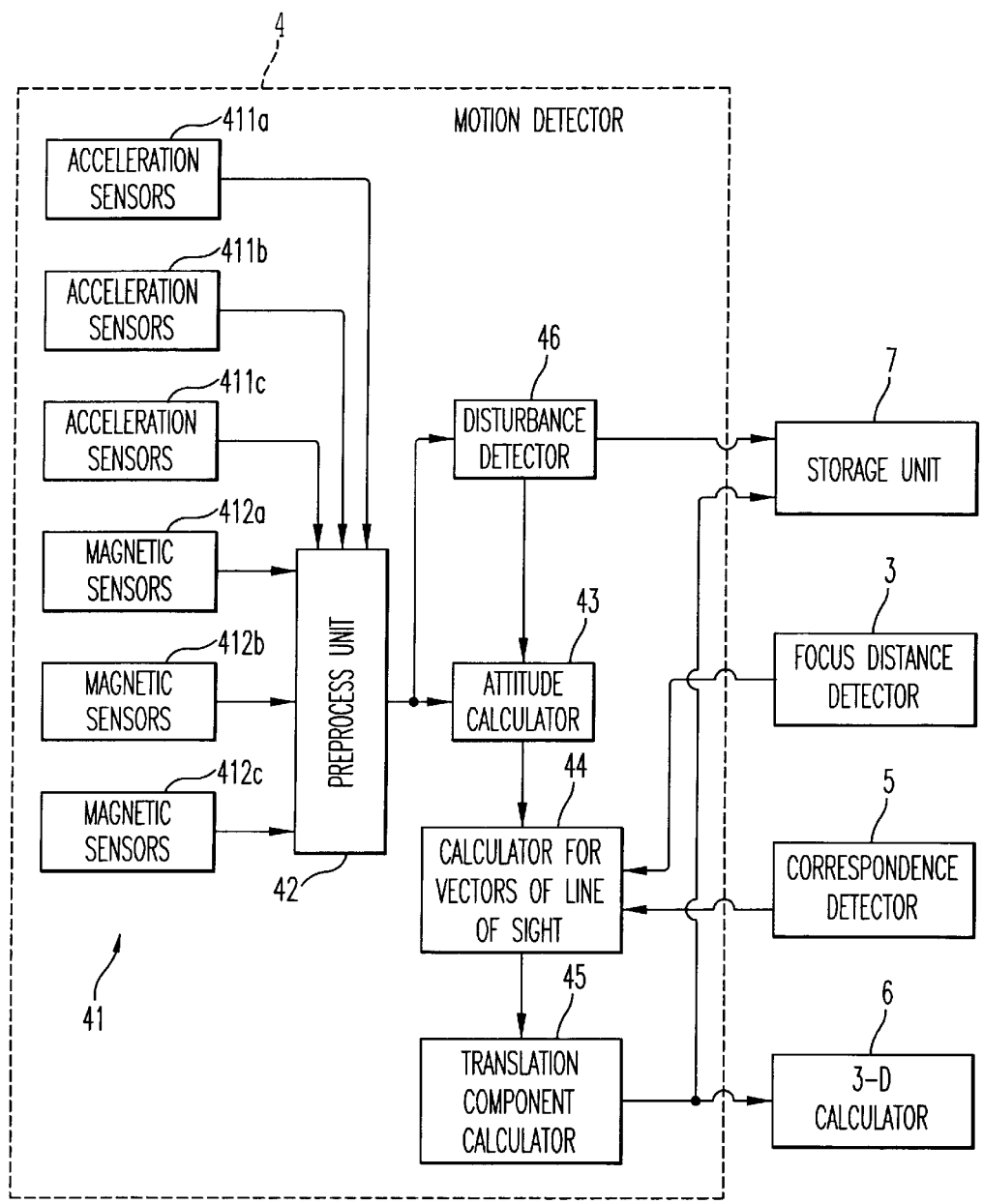
FIG. 10 shows a third embodiment of a motion detector of the present invention.

FIG. 10 shows a structure of the motion detector 4 in a further embodiment of the present invention. In the previous embodiments if the acceleration of the image capturing device becomes temporally large or an error in magnetic signals arises by electrical products, the attitude calculations can not be accurately carried out. To address these concerns, this further embodiment of FIG. 10 additionally includes a disturbance signal detector 46.

Referring to FIG. 10, the disturbance signal detector 46 detects the occurrence of acceleration other than the gravity acceleration, and also detects the occurrence of a magnetic signal other than the terrestrial magnetism. For example, a reference voltage value and a sensitivity of the three-axis acceleration sensors 411a to 411c and the three-axis magnetic sensors 412a to 412c can be predetermined and stored in the storage unit 7.

The disturbance signal detector 46 calculates the absolute value of the acceleration signal and the magnetic signal detected by each sensor. If the difference between the gravity acceleration and the absolute value corresponding to the detected acceleration signal is larger than the predetermined threshold, the disturbance signal detector 46 judges that an acceleration other than the gravity acceleration is present or an external disturbance is present, and disturbance signal detector 46 then outputs a signal corresponding to the disturbances of the acceleration signal to the attitude calculator 43. Similarly, if the difference between the terrestrial magnetism and the absolute value corresponding to the detected magnetic signal is larger than a predetermined threshold, the disturbance signal detector 46 judges that magnetic signals other than the terrestrial magnetism or an external disturbance is present, and the disturbance signal detector 46 then outputs a signal corresponding to the disturbances of the magnetic signal to the attitude calculator 43.

Figure 11:
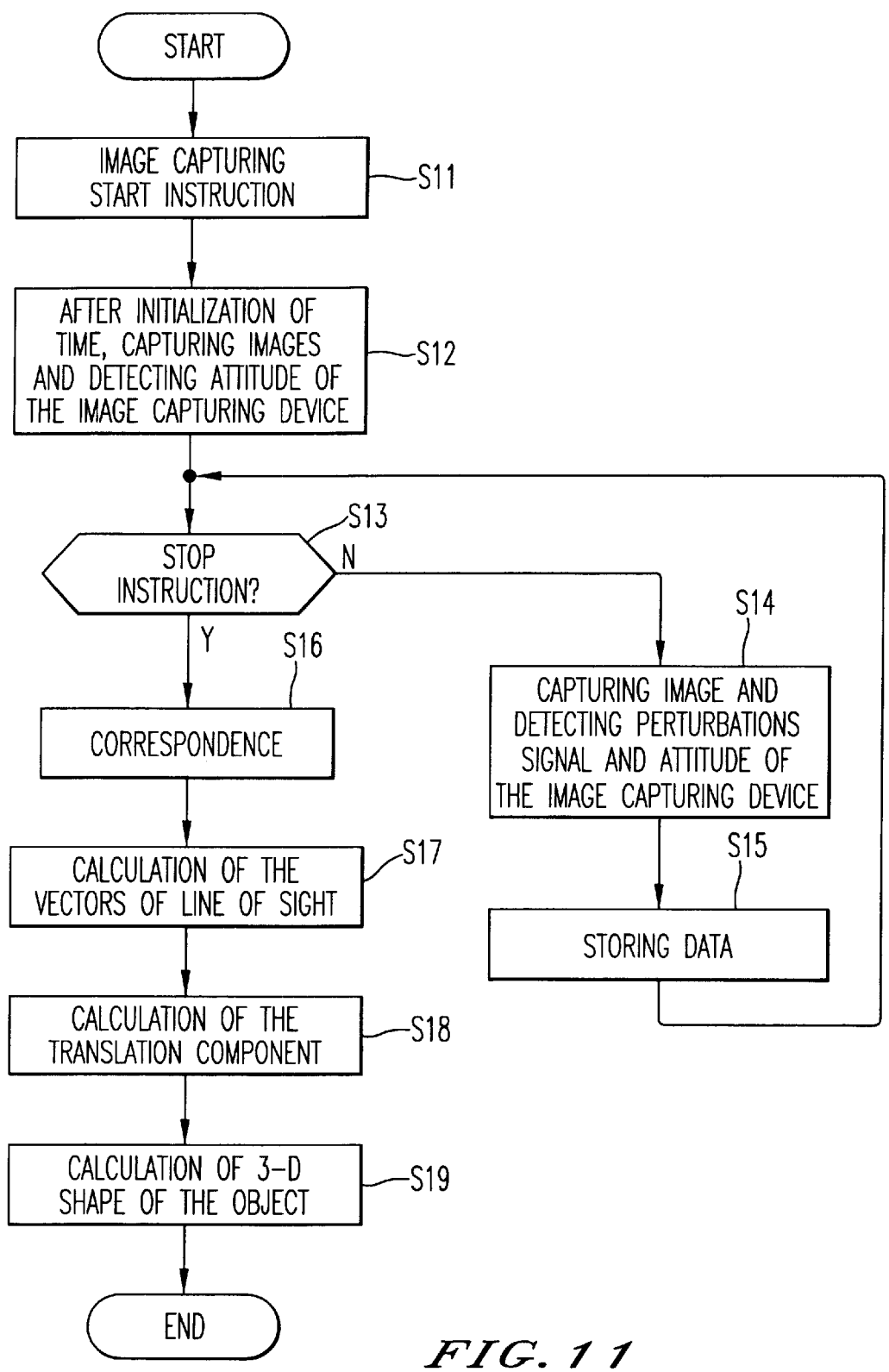
FIG. 11 shows a control process which can be executed in the present invention.

A control operation of this further embodiment of the present invention of FIG. 10 is shown in FIG. 11. The control operation shown in FIG. 11 is similar to the control operation shown in FIG. 9 except that step S14 includes an additional operation of detecting a disturbance.

In step S14, if the disturbance signal exists, the disturbance signal is detected with the image capturing and the attitude of the image capturing device. The process then proceeds to step S15, in which the detected disturbance signal is stored. The stored disturbance signal can then be utilized in the compensation calculations of steps S17, S18, and S19.

Figure 15:
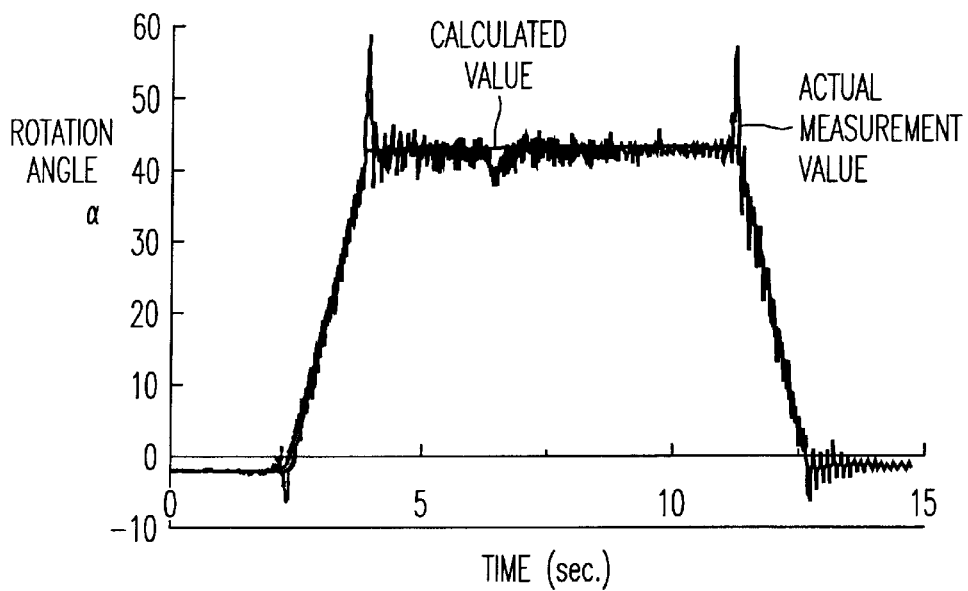
FIGS. 15–19 show signals determined by actual measurements in an image capturing device of the present invention.

Referring to FIG. 15, an example of a situation in which a disturbance of the acceleration signal arises is described. When a disturbance of the acceleration signal arises, shown as the protrusion on the left side in FIG. 15, the acceleration value corresponding to the top of the protrusion exceeds the predetermined threshold value. If calculations are carried out based upon the acceleration value corresponding to the top of the protrusion, the obtained result includes an error and is not an exact value.

In this situation in which an error arises in the acceleration signal output of acceleration sensors 411a to 411c, in the embodiment of FIG. 6 which also further includes magnetic sensors 412a to 412c and angle speed sensors 413a to 413c, the attitude calculator 43 can also calculate the rotation angles α, γ based upon the signals output by the angle speed sensors 413a to 413c. Furthermore, the attitude calculator 43 can also calculate the rotation angle β by the signals output by the magnetic sensors 412a to 412c. That is, the embodiment shown in FIG. 6 can provide a redundancy check operation to compensate for any errors which may arise from the signals output of acceleration sensors 411a to 411c, magnetic sensors 412a to 412c, and angle speed sensors 413a to 413c.

Figure 12:
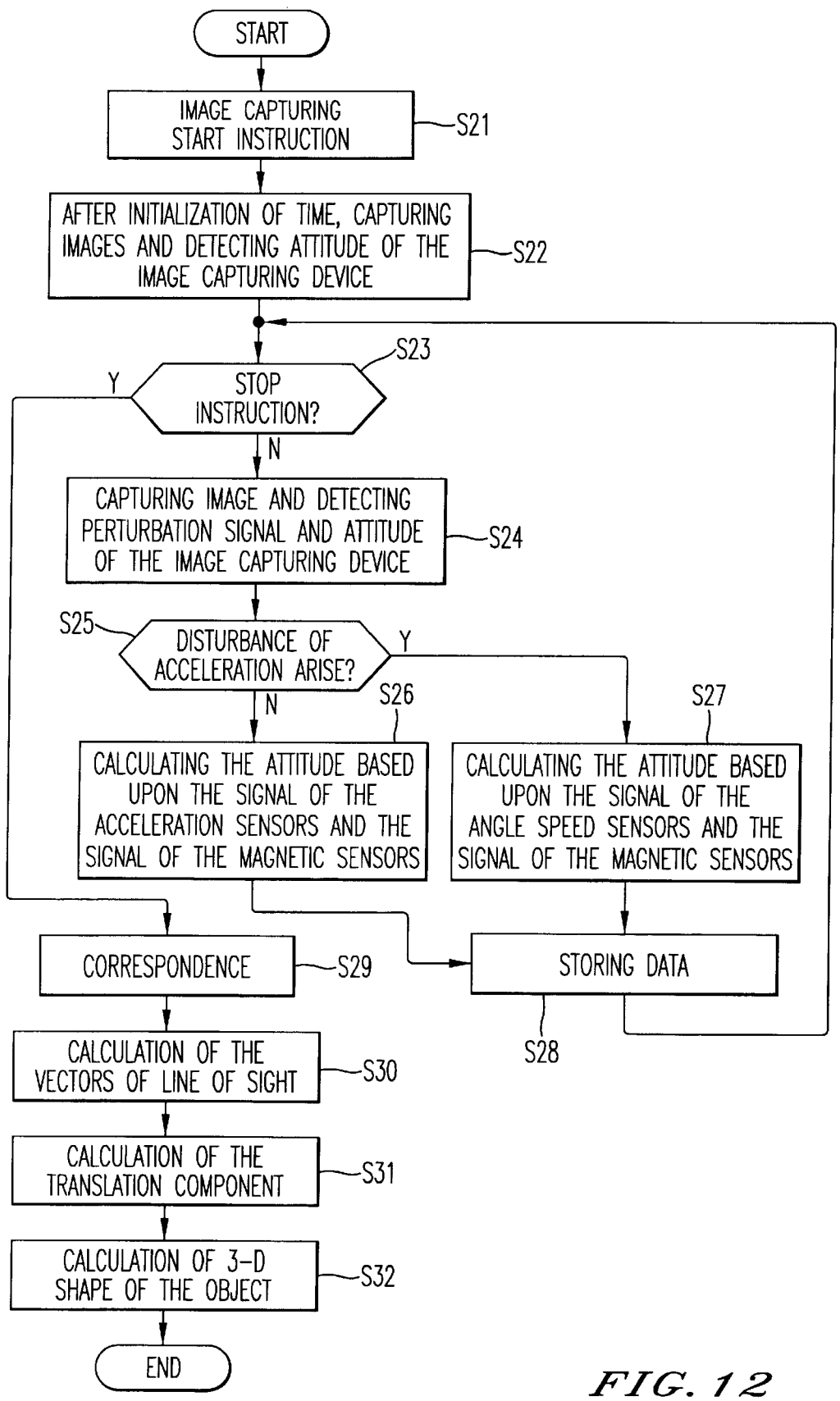
FIG. 12 shows a control operation which can be executed in the present invention.

FIG. 12 shows an operation of the embodiment of the present invention in FIG. 6 which addresses a case that an error arises in the signals output from acceleration sensors 411a to 411c, and in this case the signals output just from magnetic sensors 412a to 412c and angle speed sensors 413a to 413c are utilized to generate all necessary information.

First, steps S21–S23 in FIG. 12 are the same as steps S1–S3 in FIG. 9. Further, steps S29–S32 in FIG. 12 are the same as steps S6–S9 in FIG. 9. The description of these steps in FIG. 12 which have already been described with respect to FIG. 9 are not further described here.

In the operation of the present invention as shown in FIG. 12, when a stop instruction is not issued, i.e., No in step S23, the operation proceeds to step S24. In step S24 an image is captured and it is detected whether a disturbance signal is generated, and an attitude of the image capturing device 1 is detected. The operation then proceeds to step S25 in which it is determined whether a disturbance in the acceleration signals arises, i.e., whether a disturbance in the signals output from acceleration sensors 411a to 413c is present. If No in step S25, indicating that there is no disturbance in the signals output from acceleration sensors 411a to 411c, the operation proceeds to step S26. In step S26 the attitude of the image capturing device 1 is calculated based on the signals output from the acceleration sensors 411a to 411c and the signals output from the magnetic sensors 412a to 412c. This is an operation similar to that discussed above with respect to FIG. 9. The operation then proceeds to step S28 where data is stored, and then to step S23.

However, if there is a disturbance in the signals output from acceleration sensors 411a to 411c, i.e. Yes in step S25, the operation proceeds to step S27 in which the attitude of the image capturing device 1 is calculated based on signals output from the angle speed sensors 413a to 413c and signals output from the magnetic sensors 412a to 412c. The operation then proceeds to step S28, and then returns to step S23.

In this way, in this operation of the present invention as shown in FIG. 12 when a disturbance is generated from signals output from the acceleration sensors 411a to 411c, the same information can be gathered by utilizing data from the angle speed sensors 413a to 413c and the magnetic sensors 412a to 412c. Thus, this operation of the present invention can compensate for such a disturbance arising in the acceleration sensors 411a to 411c.

Figure 13:
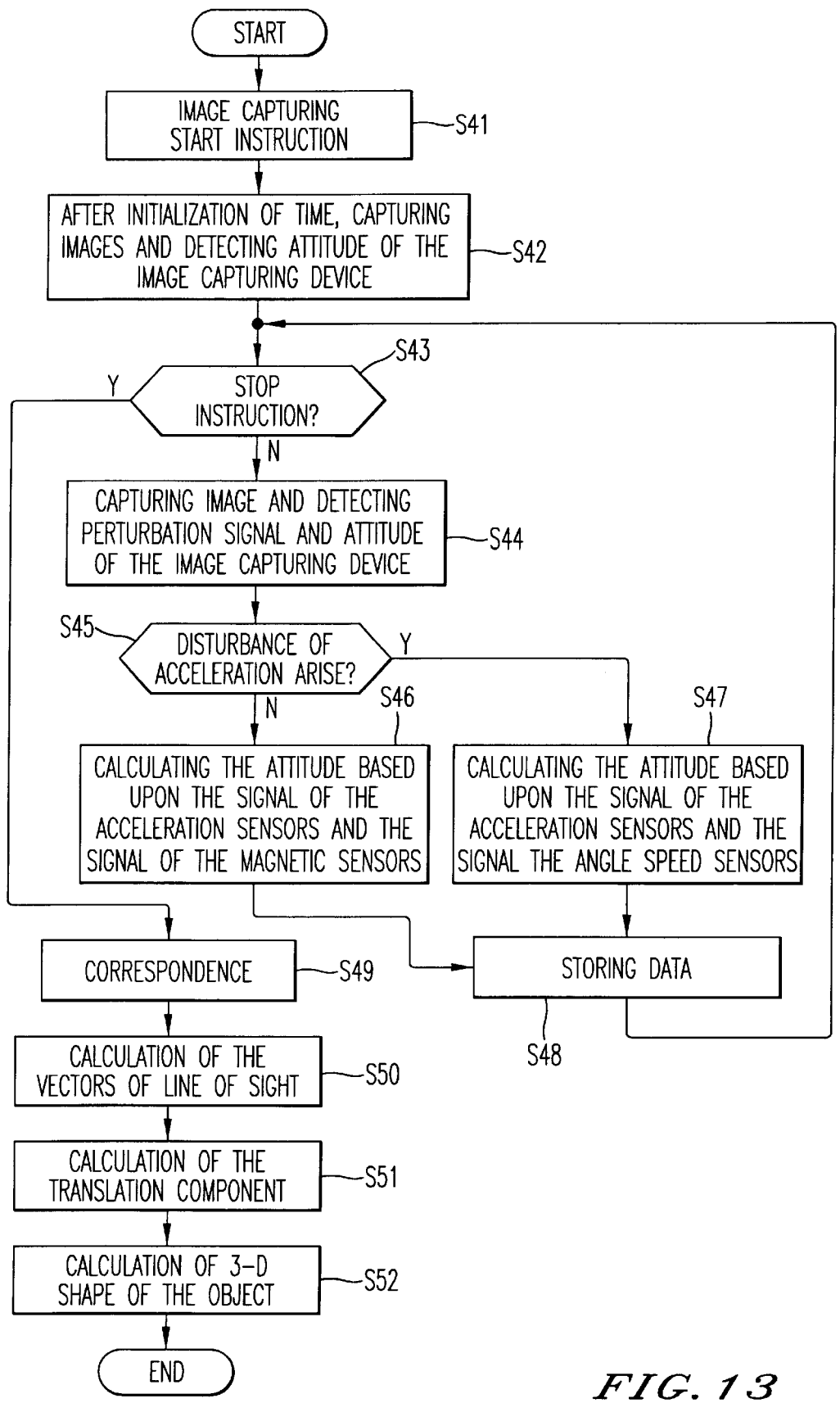
FIG. 13 shows a control operation which can be executed in the present invention.

Now referring to FIG. 13, a next embodiment compensates for a result of the attitude detection by the magnetic sensors 412a to 412c with a result of the attitude detection by the angle speed sensors 413a to 413c if the signals output from the magnetic sensors 412a to 412c include the disturbance.

In FIG. 13, steps S41 to S44 and S49 to S52 are the same as respective steps in FIG. 12, and are not again explained here. At a step S45, when the disturbance of the magnetic signal is not detected, i.e. NO in step S45, the process proceeds to step S46. In step S46, the attitude information is calculated based upon signals output from the acceleration sensors 411a to 411c and signals output from the magnetic sensors 412a to 412c, as in the embodiments noted above.

On the other hand, when a disturbance of the magnetic signals is detected, i.e. Yes in step S45, the process proceeds to step S47. In step S47 the attitude information is calculated based upon signals output from the acceleration sensors 411a to 411c and signals output from the angle speed sensors 413a to 413c. The process then proceeds to step S48, in which the image data, the attitude information, and the disturbance of the magnetic signals at each time are stored. The process then feeds back to step S43. When the stop instruction is generated at step S43, i.e. Yes in step S43, the process proceeds to step S49. The correspondence of the points is then carried out based upon the stored sequential image data. The process then proceeds to step S50. The same steps from S50 to S52 the same as the steps S29 to S32 of FIG. 12 are carried out.

Figure 14:
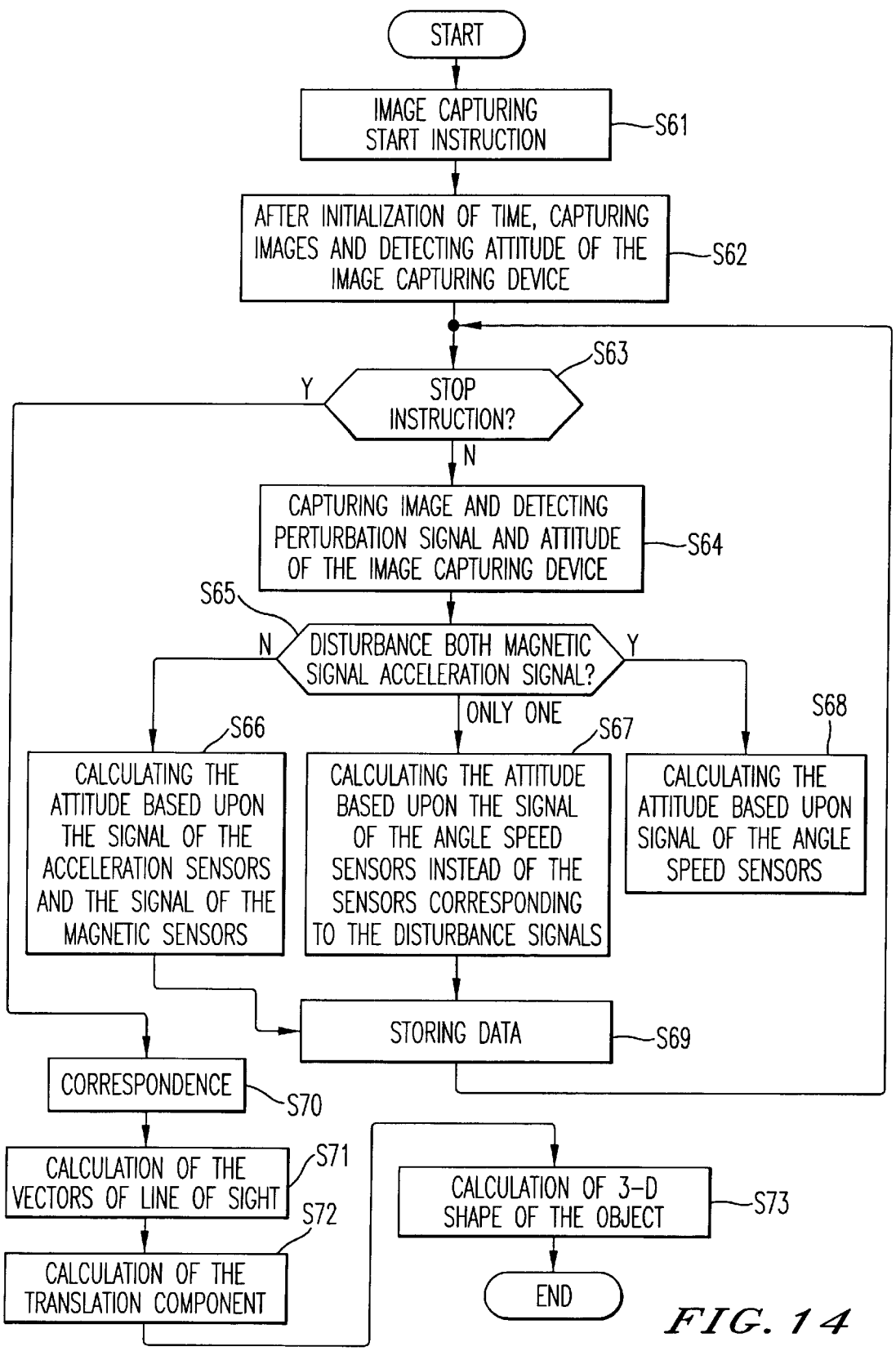
FIG. 14 shows a control operation which can be executed in the present invention.

FIG. 14 shows a further embodiment of the present invention in which a disturbance arises in the signals output from either or both the magnetic sensors 412a to 412c and the acceleration sensors 411a to 411c. In this embodiment of FIG. 14, the attitude of the image capturing device 1 is then calculated based on the signals output from the angle speed sensors 413a to 413c. In this embodiment of FIG. 14 steps S61 to S65 and steps S70 to steps S73 are the same as steps S21 to S24 and steps S29 to S32 in FIG. 12, and a further description of these steps is omitted here. Therefore, this embodiment is capable of reducing the error of the attitude detection because the attitude information is carried out not based upon accelerating or magnetic signals but based upon angle speed signals output from angle speed sensors 413a to 413c when the disturbance is detected in the acceleration or magnetic signals.

In FIG. 14 at a step S65, when the disturbance of the acceleration signals is not detected, the process proceeds to step S66. In step S66, the attitude calculator 43 calculates the rotation angles α, γ by the acceleration signals based upon the equations (6) and (7). Furthermore, the rotation angle β is calculated by the magnetic signals based upon the equation (9) or by the angle speed sensors 413a to 413c based upon the equations (19) and (22). This is the same as in operations noted above in which no disturbance exists.

On the other hand, at step S65, when the disturbance of the acceleration signals is detected, i.e. Yes in step S65, the process proceeds to step S67. In step S67, the attitude calculator 43 calculates the rotation angles α, γ based upon the equations (21) and (23). The rotation angle β is calculated by the signals of the magnetic sensors 412a to 412c and the calculated rotation angle α with the equation (9) or by the signals of the angle speed sensors with the equations (19) and (22).

Furthermore, at step S65, when a disturbance of the magnetic signals is detected, the rotation angles α, γ are calculated by the acceleration signals with the equations (6) and (7) and the rotation angle β is also calculated by the signals of the angle speed sensors 413a to 413c with the equation (22). Finally, at step S65, when a disturbance of both the acceleration signals and the magnetic signals arises, the process proceeds to a step S68. In step S68, the rotation angles α, β, γ are calculated by the signals output from the angle speed sensors 413a to 413c with the equations (18) to (23).

The process then proceeds to step S69, in which the image data, attitude information, and the disturbances of each signal at each time are stored. When the stop instruction is generated, i.e. Yes in step S65, the correspondence is carried out based upon the stored sequential image data.

Therefore, this embodiment of FIG. 14 is capable of reducing the error of the attitude detection because the signals of the angle speed sensors 413a to 413c compensate for the attitude information when disturbances are detected in the acceleration signals and/or the magnetic signals.

Furthermore, in the above embodiments, the calculations can be carried out at an off-line process by which the correspondence of the characteristic points of the images, the translation component, and the 3-D shape of the object are calculated based upon the stored data. These calculations are capable of being carried out by a real-time process.

Furthermore, when the image capturing device 2 has fixed focuses, the focus distance detector 3 is capable of being omitted. Still furthermore, the image data, the attitude information and the 3-D shape of the object is also capable of transferring a server via a network.

The present invention is capable of employing other compensation methods based upon changes of signals of the angle speed sensor at a slight interval.

Referring to FIG. 15 to FIG. 19, signals determined by actual measurements of the image capturing device 2 of the present invention are described and compared with calculated ideal values.

Referring again to FIG. 15, this figure shows results of detecting an actual rotation angle α by the acceleration sensors 411a to 411c, and a calculated value of rotation angle α for comparison.

FIG. 15 shows a situation in which a disturbance arises in the signals output from the acceleration sensors 411a to 411c, and as a result a protrusion portion arises in the signals as shown by the actual measurement value in FIG. 15. In this situation the image capturing apparatus cannot calculate a correct value of the rotation angle α based upon the disturbed signals output from the acceleration sensors 411a to 411c.

To overcome this situation in which a disturbance arises in the signals output from the accelerations sensors 411a to 411c, the rotation angle α corresponding to the disturbance portion can be calculated by signals output from the angle speed sensors 413a to 413c. Utilizing the angle speed sensors 413a to 413c when an error arises in the signals output from the acceleration sensors 411a to 411c can render the actual measurement value closer to the calculated value. This situation of utilizing the angle speed sensors 413a to 413c to compensate for a disturbance arising in signals output from the acceleration sensors 411a to 411c is shown in FIG. 17, which provides a comparison with FIG. 15.

Figure 16:
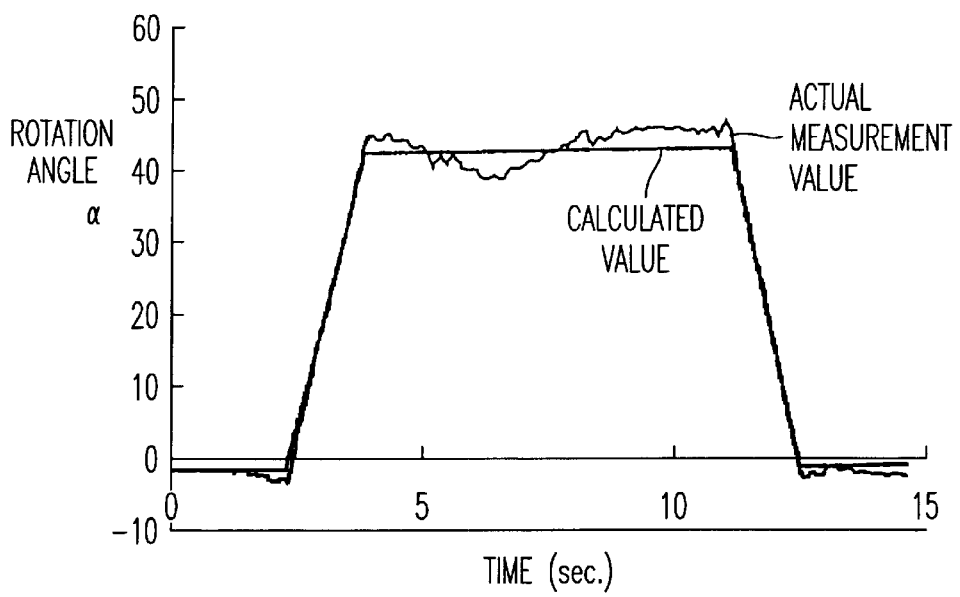

Referring to FIG. 16, FIG. 16 shows a calculated value of rotation angle α by a solid line in comparison with an actual rotation angle α0 when detected by the angle speed sensors 413a to 413c.

Figure 17:
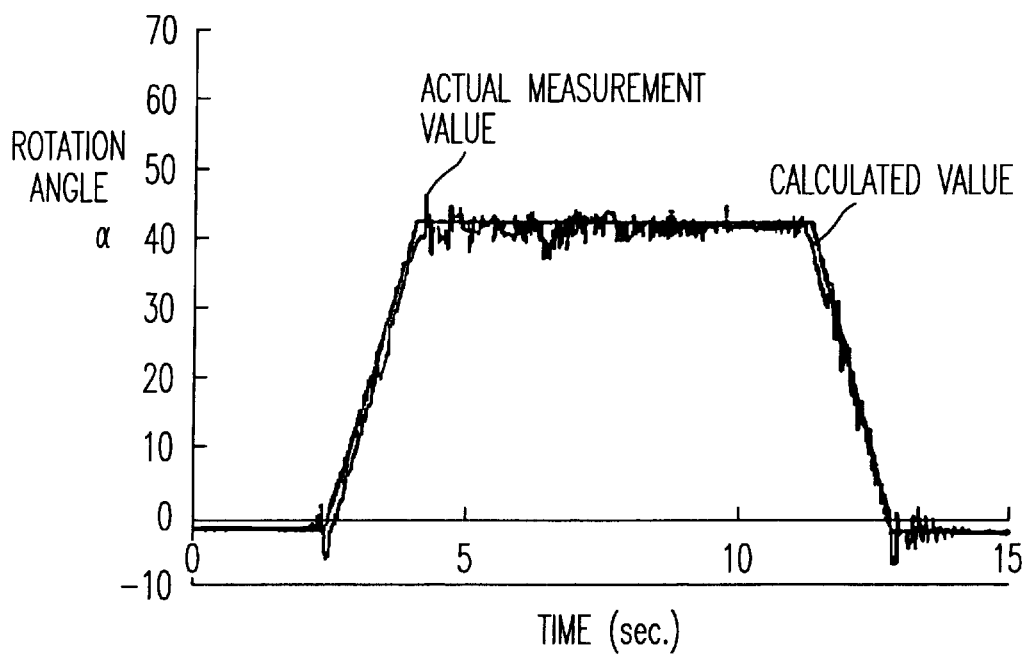

Referring to FIG. 17, and as noted above, this figure shows an actual value of calculating the rotation angle α with the angle speed sensors 413a to 413c when a disturbance arises in the acceleration signals, and in comparison with a calculated rotation angle. That is, FIG. 17 shows the benefits achieved in the present invention by utilizing the control operation of FIG. 12 in which disturbances in the acceleration sensors 411a to 411c are compensated for by utilizing the angle speed sensors 413a to 413c. FIG. 17 shows improvements over the detection operation of FIG. 15. As shown in FIG. 17, when the image capturing apparatus 1 rotates or stops, the acceleration signal becomes temporally big and the disturbance of the acceleration signal arises. However, the disturbance becomes small so that the rotation angle α is compensated for by the angle speed sensors 413a to 413c.

Figure 18:
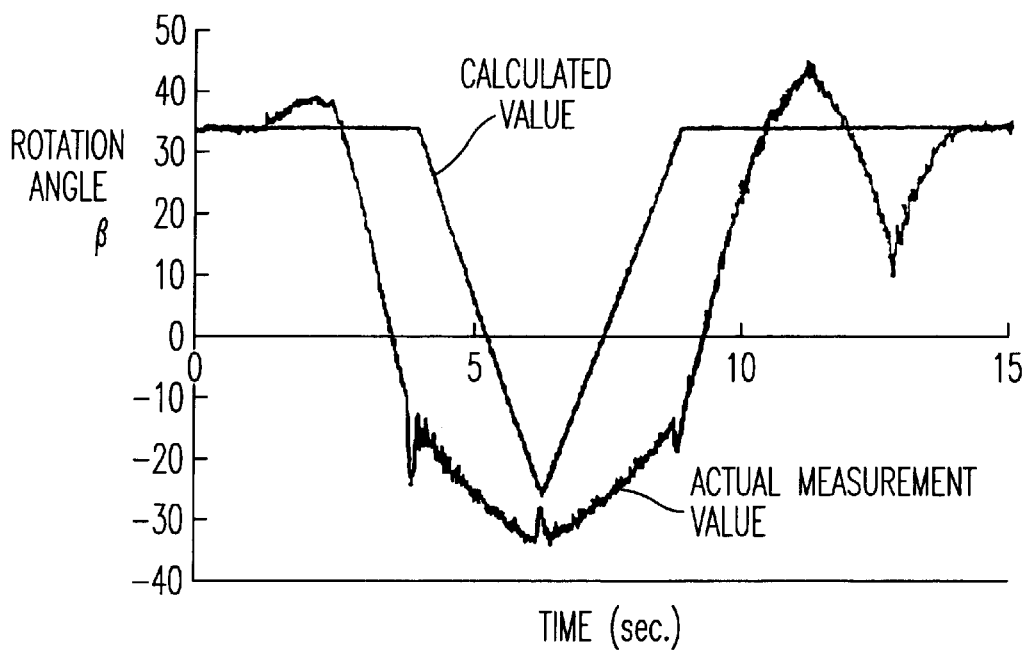

Now referring to FIG. 18, this figure shows an actual value of calculating the rotation angle β utilizing the magnetic sensors 412a to 412c, and in which an error, i.e. a protrusion portion, arises in the signals output by the magnetic sensors 412a to 412c, and in comparison with a calculated rotation angle β. Thus, in this case of FIG. 18 the disturbance in the magnetic sensors 412a to 412c calculating the rotation angle β is not compensated for.

Figure 19:
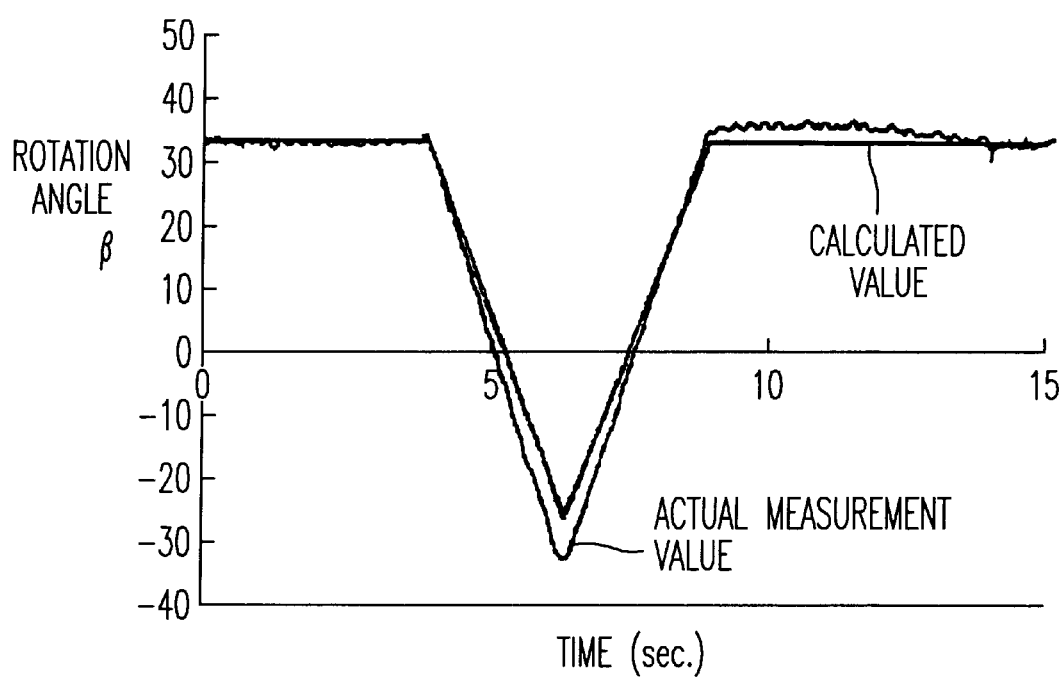

Referring to FIG. 19, this figure shows an actual value of calculating the rotation angle β with the angle speed sensors 413a to 413c when a disturbance of the magnetic signals arises, as in FIG. 18. As is shown in FIG. 19, in this operation of the present invention the disturbance becomes small so that the calculation of rotation angle β in which an error arises in the signals output from the magnetic sensors 412a to 412c is compensated for utilizing the angle speed sensors 413a to 413c. Thus, this operation resulting in FIG. 19 provides improved results over the results shown in FIG. 18.

Obviously, numerous additional modifications and variations of the present invention are possible in light of the above teachings. It is therefore to be understood that within the scope of the appended claims, the present invention may be practiced otherwise than as specifically described herein.

The present document is based on Japanese Priority Document 10-051291, filed in the Japanese Patent Office on Feb. 18, 1998, the entire contents of which are incorporated herein by reference.

What is claimed is:

1. An image capturing apparatus for an object, comprising:

an image capturing device configured to capture images of the object;

a correspondence detector configured to detect a correspondence of characteristic points of the object based upon the captured images;

a motion detector configured to detect a motion of the image capturing device, the motion detector including magnetic sensors; and a shape calculator configured to calculate a shape of the object based upon the captured image data, captured attitude information and a translation component of the image capturing apparatus based upon the detected motion of the image capturing device detected by the motion detector, and the correspondence of said characteristic points.

2. An image capturing apparatus for an object, comprising:
an image capturing device configured to capture images of the object;
a correspondence detector configured to detect a correspondence of characteristic points of the object based upon the captured images;
a motion detector configured to detect a motion of the image capturing device, the motion detector including magnetic sensors; and
a shape calculator configured to calculate a shape of the object based upon the captured image data, captured attitude information and a translation component of the image capturing apparatus based upon the detected motion of the image capturing device detected by the motion detector, and the correspondence of said characteristic points,
wherein the motion detector further includes acceleration sensors and angle speed sensors.

3. An image capturing apparatus for an object according to claim 2, further comprising a disturbance detector configured to detect a disturbance of acceleration signals output by the acceleration sensors and a disturbance of magnetic signals output by the magnetic sensors.

4. An image capturing apparatus for an object according to claim 3, further comprising an attitude calculator configured to calculate an attitude of the image capturing apparatus based upon a compensation signal of said disturbance detector when the image capturing device is moving.

5. An image capturing apparatus for an object according to claim 4, wherein said attitude calculator calculates an attitude of the image capturing apparatus by compensation utilizing the magnetic signals output from the magnetic sensors instead of acceleration signals output by the acceleration sensors when a disturbance is detected in the acceleration signals.

6. An image capturing apparatus for an object according to claim 4, wherein said attitude calculator calculates the attitude of the image capturing apparatus by compensation utilizing the magnetic signals output from the magnetic sensors and angle speed signals output from the angle speed sensors instead of acceleration signals output from the acceleration sensors when a disturbance is detected in the acceleration signals.

7. An image capturing apparatus for an object according to claim 4, wherein said attitude calculating calculates the attitude of the image capturing apparatus by compensation utilizing the acceleration signals output from the acceleration sensors when a disturbance is detected in the magnetic signals.

8. An image capturing apparatus for an object according to claim 4, wherein said attitude calculator calculates the attitude of the image capturing apparatus by compensation utilizing the acceleration signals output from the acceleration sensors and angle speed signals output from the angle speed sensors when a disturbance is detected in the magnetic signals.

9. An image capturing apparatus for an object according to claim 4, wherein said attitude calculator calculates the attitude of the image capturing apparatus by compensation utilizing the magnetic signals output from the magnetic sensors and angle speed signals output from the angle speed sensors when a disturbance is detected in the acceleration signals.

10. An image capturing apparatus for an object, comprising:
image capturing means for capturing images of the object;
correspondence detector means for detecting a correspondence of characteristic points of the object based upon the captured images;
motion detector means for detecting a motion of the image capturing means, the motion detector means including magnetic sensor means; and
shape calculator means for calculating a shape of the object based upon the captured image data, captured attitude information and a translation component of the image capturing means based upon the detected motion of the image capturing means detected by the motion detector means, and the correspondence of said characteristic points.

11. An image capturing apparatus for an object, comprising:
image capturing means for capturing images of the object;
correspondence detector means for detecting a correspondence of characteristic points of the object based upon the captured images;
motion detector means for detecting a motion of the image capturing means, the motion detector means including magnetic sensor means; and
shape calculator means for calculating a shape of the object based upon the captured image data, captured attitude information and a translation component of the image capturing means based upon the detected motion of the image capturing means detected by the motion detector means, and the correspondence of said characteristic points,
wherein the motion detector means further includes acceleration sensor means and angle speed sensor means.

12. An image capturing apparatus for an object according to claim 11, further comprising disturbance detector means for detecting a disturbance of acceleration signals output by the acceleration sensor means and a disturbance of magnetic signals output by the magnetic sensor means.

13. An image capturing apparatus for an object according to claim 12, further comprising attitude calculator means for calculating an attitude of the image capturing means based upon a compensation signal of said disturbance detector means when the image capturing means is moving.

14. An image capturing apparatus for an object according to claim 13, wherein said attitude calculator means calculates an attitude of the image capturing means by compensation utilizing the magnetic signals output from the magnetic sensor means instead of acceleration signals output by the acceleration sensor means when a disturbance is detected in the acceleration signals.

15. An image capturing apparatus for an object according to claim 13, wherein said attitude calculator means calculates the attitude of the image capturing means by compensation utilizing the magnetic signals output from the magnetic sensor means and angle speed signals output from the angle speed sensor means instead of acceleration signals output from the acceleration sensor means when a disturbance is detected in the acceleration signals.

16. An image capturing apparatus for an object according to claim 13, wherein said attitude calculating means calculates the attitude of the image capturing means by compensation utilizing the acceleration signals output from the acceleration sensor means when a disturbance is detected in the magnetic signals.

17. An image capturing apparatus for an object according to claim 13, wherein said attitude calculator means calculates the attitude of the image capturing means by compensation utilizing the acceleration signals output from the acceleration sensor means and angle speed signals output from the angle speed sensor means when a disturbance is detected in the magnetic signals.

18. An image capturing apparatus for an object according to claim 13, wherein said attitude calculator means calculates the attitude of the image capturing means by compensation utilizing the magnetic signals output from the magnetic sensor means and angle speed signals output from the angle speed sensor means when a disturbance is detected in the acceleration signals.

* * * * *